US009926974B2

(12) United States Patent
Ciulla et al.

(10) Patent No.: US 9,926,974 B2
(45) Date of Patent: Mar. 27, 2018

(54) ROLLER BEARING, IN PARTICULAR FOR A VEHICLE STEERING SYSTEM OR FOR A VEHICLE WHEEL HUB ASSEMBLY

(71) Applicants: Luca Ciulla, Turin (IT); William Finetti, Turin (IT); Francesco Lamboglia, Pinerolo (IT); Gerardo Rainone, Piossaco (IT); Laura Sguotti, Pinerolo (IT)

(72) Inventors: Luca Ciulla, Turin (IT); William Finetti, Turin (IT); Francesco Lamboglia, Pinerolo (IT); Gerardo Rainone, Piossaco (IT); Laura Sguotti, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/185,202

(22) Filed: Jun. 17, 2016

(65) Prior Publication Data
US 2016/0369841 A1 Dec. 22, 2016

(30) Foreign Application Priority Data

Jun. 19, 2015 (IT) .................. 102015000025419

(51) Int. Cl.
F16C 19/18 (2006.01)
F16C 43/06 (2006.01)
(Continued)

(52) U.S. Cl.
CPC .......... F16C 19/18 (2013.01); B60B 27/0005 (2013.01); B62D 5/0403 (2013.01);
(Continued)

(58) Field of Classification Search
CPC ...... F16C 19/18; F16C 19/181; F16C 19/184; F16C 33/583; F16C 33/585; F16C 33/586; F16C 33/60; F16C 43/06
See application file for complete search history.

(56) References Cited

U.S. PATENT DOCUMENTS 1,794,772 A 3/1931 Hughes
5,501,530 A 3/1996 Nagai et al.
(Continued)

FOREIGN PATENT DOCUMENTS

FR 2916026 A1 11/2008
JP 2007046636 A 2/2007
JP 2011117474 A 6/2011

Primary Examiner — James Pilkington
(74) Attorney, Agent, or Firm — Bryan Peckjian; SKF USA Inc. Patent Dept.

(57) ABSTRACT

A roller bearing including an outer ring, at least one inner ring and a plurality of rolling bodies inserted between the outer ring and the inner ring. The outer ring presents an osculation of between 0.51 and 0.56 and the inner ring presents an annular race having a bottom surface delimited by an annular relief (16) including a cylindrical section (18) with a greater diameter than that of the bottom surface (12), a first convex curved section (19) having a pre-established radius of curvature (R1) and which connects with continuity the annular bottom surface (12) of the first annular race with the cylindrical section (18), a second convex curved section (20) which connects with continuity with the cylindrical section (18) and a third concave curved section (21) that connects with continuity with the second section (20).

8 Claims, 2 Drawing Sheets

(51) Int. Cl.
- *F16C 33/58* (2006.01)
- *F16C 33/60* (2006.01)
- *B60B 27/00* (2006.01)
- *B62D 5/04* (2006.01)

(52) U.S. Cl.
CPC .......... *F16C 19/184* (2013.01); *F16C 33/585* (2013.01); *F16C 33/60* (2013.01); *F16C 43/06* (2013.01); *B60B 2380/12* (2013.01); *B60B 2380/62* (2013.01); *B60B 2380/73* (2013.01); *F16C 2326/02* (2013.01); *F16C 2326/24* (2013.01)

(56) References Cited

U.S. PATENT DOCUMENTS

| | | | |
|---|---|---|---|
| 6,428,214 B2 * | 8/2002 | Tajima | B60B 27/00 29/898.063 |
| 7,648,283 B2 | 1/2010 | Komori | |
| 7,832,941 B2 * | 11/2010 | Komori | B60B 27/0005 384/490 |
| 2008/0205811 A1 | 8/2008 | Komori et al. | |
| 2011/0222807 A1 | 9/2011 | Tanoue et al. | |
| 2012/0148181 A1 | 6/2012 | Aritake et al. | |

* cited by examiner

ROLLER BEARING, IN PARTICULAR FOR A VEHICLE STEERING SYSTEM OR FOR A VEHICLE WHEEL HUB ASSEMBLY

CROSS-REFERENCE

This application claims priority to Italian patent application no. 102015000025419 filed on Jun. 19, 2015, the contents of which are fully incorporated herein by reference.

FIELD OF THE INVENTION

The present invention relates to a roller bearing, in particular for an electrically assisted steering system for a vehicle, in which bearing the rolling bodies are retained by snapping into the associated rolling races, and therefore without the use of additional elements, and that moreover presents low friction in service. The roller bearing of the invention can also be used in/on a vehicle wheel hub assembly.

BACKGROUND OF THE INVENTION

The roller bearings used in the steering systems or on the wheel hub assemblies of vehicles comprise an outer ring, which may be flanged in the case of bearings intended for equipping a wheel hub assembly and an inner pair of flanked rings, arranged coaxially with respect to a common axis of relative rotation with the outer ring and rotatable with respect to the outer ring for the insertion of two bands of rolling bodies.

The rolling bodies, generally balls, are fitted between the outer and inner rings of the roller bearing with the insertion of a unit formed by the rolling bodies and by a cage for containing the rolling bodies inside the outer ring, and then inserting the inner rings into the "pack" consisting of the rolling bodies retained by the associated cage and already fitted inside the outer ring. However, it is also necessary to guarantee that the rings, in particular the inner rings, do not escape, for example during transport or in any case before final assembly. For this purpose at least the inner rings must be provided with integral axial shoulder means that prevent them from accidentally escaping from the "pack" consisting of the rolling bodies retained by the associated cage and already fitted into the outer ring.

According to several known solutions, such means of shouldering are composed of elastic means of retention ("clip rings") or other means of locking that are fitted integrally between the inner rings after their insertion, or that are rendered integral by the rolling body containment cage. According to other known solutions, on the other hand, a roller bearing is made that has a shoulder obtained integrally in one piece with each inner ring and the assembly of the rolling bodies takes place by "snap-in" forcing, profiting from the elasticity of the materials with which the inner and outer rings and rolling bodies are made, generally steel, and above all profiting from a specially studied geometry of the shoulder obtained integral with each inner ring.

A dual solution is also known in which the shoulder is made on the outer ring, on each axial end of the same, and the "pack" of balls is first fitted on an inner ring, with the creation of a unit which is then inserted from one side of the outer ring and that then receives the second inner ring with the associated balls from the other side.

In any case, the shoulder creates an annular sub-square that keeps the rolling bodies in position after their insertion and renders the roller bearing "self-retaining", but which must be got over, "jumped" in effect, during the insertion phase. A similar solution is known, for example from U.S. Pat. No. 7,648,283 and from US2012/0148181.

Nevertheless, it has been found that during insertion of the rolling bodies on the inner rings (or on the outer ring), the rolling bodies can be subject to relatively high localized stresses that can damage them, with the consequent generation of noise in use; furthermore, the friction in use of the known roller bearings is relatively high, with consequent undesired energy consumption and especially with undesired heating of the roller bearing.

BRIEF SUMMARY OF THE INVENTION

The scope of the present invention is to provide a roller bearing, in particular for a steering system or a vehicle wheel hub assembly, that is "self-retaining", i.e. made in such a way as to retain the rolling bodies within the associated rolling races after their insertion into the rolling races themselves without the use of additional elements, and which at the same time presents a low level of friction in service, and a reduced or zero risk of damaging the rolling bodies when inserting them into the rolling races, all with limited dimensions while obtaining a high level of simplicity of assembly.

On the basis of the invention, a roller bearing is therefore supplied, in particular for a steering system or a vehicle wheel hub assembly, as defined in the attached claims.

BRIEF DESCRIPTION OF THE SEVERAL VIEWS OF THE DRAWING

The invention will now be described with reference to the attached drawings, which illustrate a non-limitative example of embodiment, in which.

DETAILED DESCRIPTION OF THE INVENTION

Figure 1:
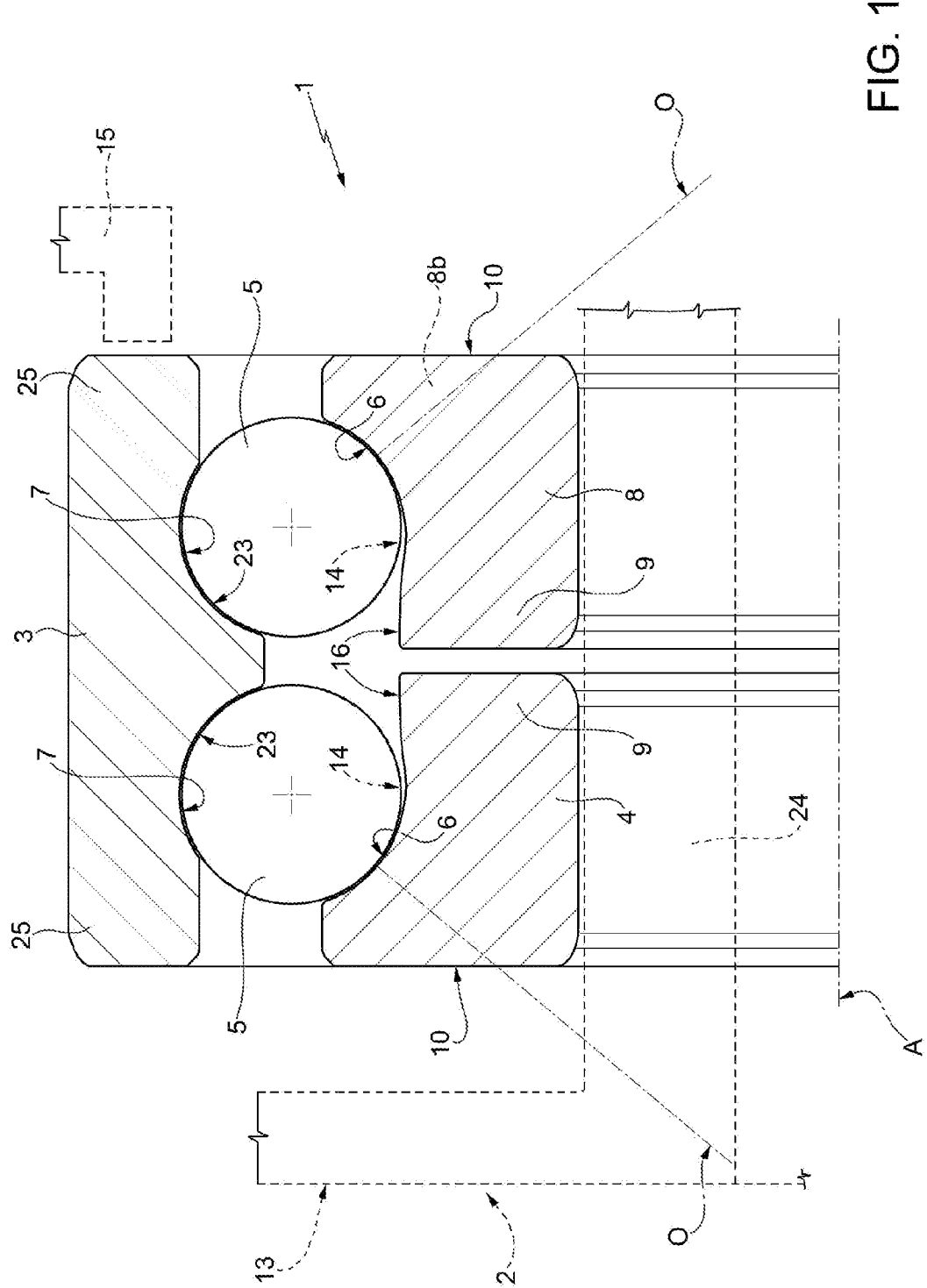
FIG. 1 schematically illustrates in radial section a longitudinal view of one half of a roller bearing used in accordance with the invention, the removed part being symmetrical with respect to the illustrated one and, in the illustrated example, being part of a vehicle wheel hub assembly, illustrated hatched.
Figure 2:
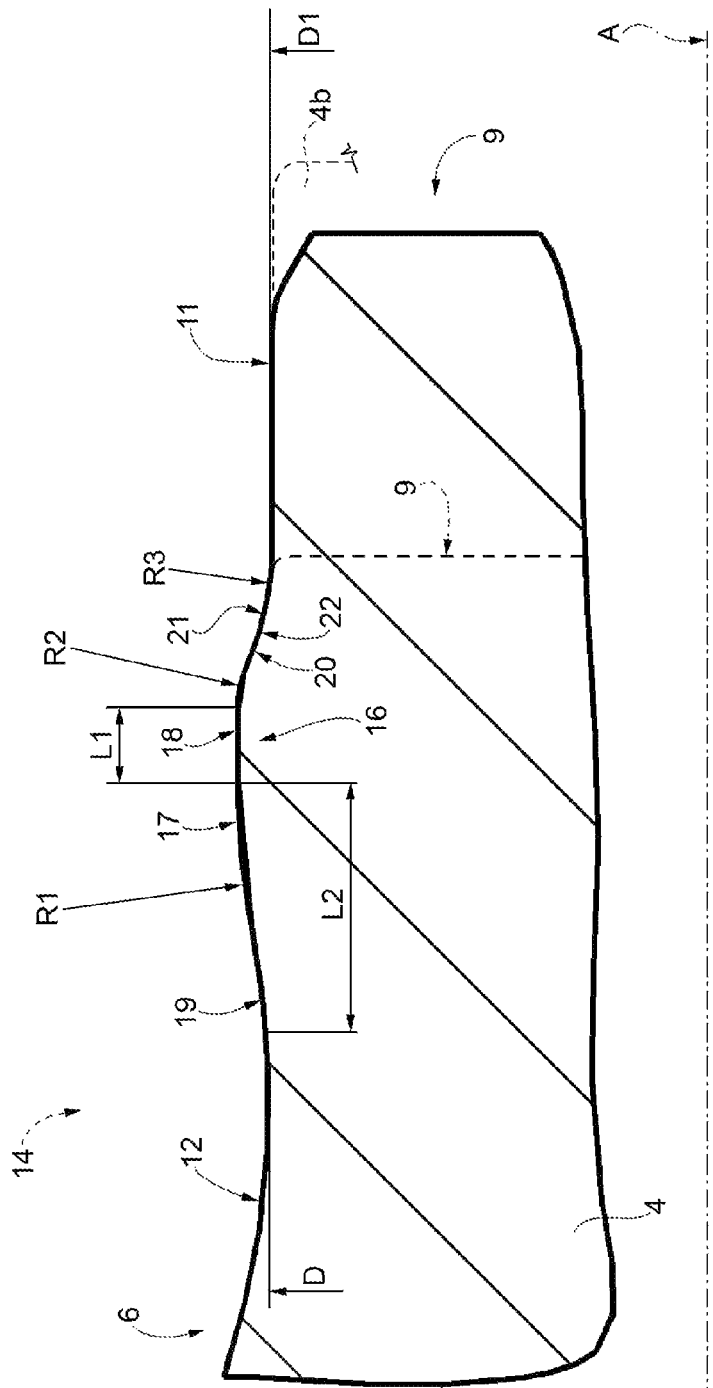
FIG. 2 provides an illustration on an enlarged scale and again in radial section of a construction detail of an inner ring of the roller bearing in FIG. 1.

With reference to FIGS. 1 and 2, 1 indicates a roller bearing in its entirety, in the non-limitative example illustrated as part of a vehicle wheel hub assembly 2, illustrated only schematically and by hatching for simplicity.

The roller bearing 1, which is of the type that is also suitable for fitting in the steering unit of a vehicle, in particular of the electrically assisted type, known and not illustrated for simplicity, comprises at least one first ring 4, in this case defined by an inner ring of the bearing 1, at least one second ring 3, in this case defined by an outer ring of the bearing 1 and a plurality of rolling bodies 5 inserted between the outer ring 3 and inner ring 4 in order to render the outer 3 and inner 4 rings relatively rotatable around an axis of rotation A; the rolling bodies 5 are housed in at least one annular band of rolling bodies that engage a first annular race 6 obtained radially on the outside of the inner ring 4 and a second annular race 7 obtained radially on the inside of the outer ring 3, in a position facing the annular race 6.

In the non-limiting example illustrated, the rolling bodies consist of balls 5 and are housed in two bands of rolling bodies arranged adjacently, and the roller bearing 1 comprises two inner rings 4 and 8 specularly symmetrical and arranged side by side and coaxially with one another, while the outer ring 3 is provided with a pair of annular races 7 arranged flanked and adjacent to one another; each inner ring 4 and 8 is provided with an annular race 6 arranged facing a corresponding race 7 along an axis 0 oblique with respect to the axis A of rotation.

The balls 5 of each band of rolling bodies engage a pair of annular races 6 and 7 arranged facing one another according to the oblique axis 0 and obtained radially respectively on the outside of the rings 4 and 8 and radially on the inside of the external ring 3 and the rings 4 and 8 each represent a first end 9 and a second end 10, opposite the end 9. The ends 9 are arranged closely and facing each other, and adjacently, while the ends 10 are arranged distally and their radial thickness is greater than that of the ends 9, as they flank the races 6 in order to axially contain the balls 5 towards the outside of the roller bearing 1. The ends 9 can be separated from one another axially as is non-limitatively illustrated in FIG. 1, or in contact with one another.

The ends 9 constitute the ends of introduction of the balls 5 into the races 6. In the non-limitative example illustrated the ends 9 are each delimited—with reference to FIG. 2 which on an enlarged scale, illustrates only ring 4 for simplicity—by a radially external cylindrical lateral surface 11, which presents a diameter D1; a race 6 is arranged in correspondence with each end 9 of the first rings 4 and 8 and is radially delimited by a bottom annular concave surface 12 which presents a diameter D in the example illustrated.

Again with reference to FIG. 1, the roller bearing 1 can constitute part of a traditional type of wheel hub assembly 2. In this case, the wheel hub assembly 2 comprises the outside ring 3, which is provided with a pair of annular races 7 arranged side by side and adjacent to one another, a double band of balls 5 and a pair of inner rings 4 and 8 mounted on a spindle or hub 24 having a flanged end 13 for the connection of a vehicle wheel, not illustrated for simplicity.

The outer ring 3 can be provided with one end 15 for connection to a vehicle suspension, known and not illustrated for simplicity.

In order to retain the balls 5 on the races 6 and/or the rings 4, 8 inside the outer ring 3 before completing assembly, each of the ends 9 of the rings 4, 8 of the bearing 1, is provided with an annular relief 16 (FIG. 2) designed in such a way as to create an axial retention shoulder for the balls 5.

In particular, the annular relief 16 is obtained in a position immediately adjacent to the annular concave bottom surface 12 of each race 6 on the end 9 of each ring 5 or 8 which, according to the variant illustrated hatched in FIG. 2, can also not have the cylindrical section defined by the lateral surface 11 and terminate in correspondence with the relief 16, with the relief 16 itself.

The annular relief 16 is, in any case, always delimited by a lateral surface 17, comprising a cylindrical section 18 having a diameter such that, with respect to a diameter of the annular bottom surface 12, it permits the annular relief 16 to constitute—towards the annular bottom surface 12—an axial retention shoulder for the rolling bodies 5.

In the non-limitative example of embodiment illustrated the relief 16 is delimited radially on the outside by the lateral surface 17, the cylindrical section 18 of which has a greater diameter than a minimum diameter D of the concave annular bottom surface 12 of each race 6 by an amount that is minimum but sufficient to permit the annular relief 16 to constitute an axial retention shoulder for the rolling bodies 5.

According to a first aspect of the invention, the lateral surface 17 of the annular relief 16 transitions into a first section 19 (FIG. 2), the first section 19 turned towards the race 6 adjacent to/delimited by the lateral surface 17. The first section 19 is defined by a curved annular surface having in radial section an arc-shaped circumferential profile and having a first radius of curvature R1 of pre-established value measured transversally to the axis of rotation A; the curvature (i.e. the position of the centre of the radius of curvature R1) of the first section 19 is turned towards the ring 4, in such a way that the first section 19 is delimited by a convex annular surface of the lateral surface 17. The convex annular surface of the lateral surface 17 connects with continuity, the first section 19 and the cylindrical section 18 of the lateral surface 17 of the annular relief 16.

According to a further aspect of the invention, the lateral surface 17 of the annular relief 16 also comprises a second section 20 immediately adjacent to the cylindrical section 18 on the side opposite the section 19 and defined by a curved annular surface having a circular profile in radial section and having a second radius of curvature R2 of pre-established value and having the same curvature as the first section 19, in such a way that the second section 20 is delimited by an annular convex surface which connects with continuity with the cylindrical section 18.

Finally, the lateral radially external surface 17 of the annular relief 16 also comprises a third section 21, which is immediately adjacent to the second section 20 on the side opposite the cylindrical section 18 and is defined by a curved annular surface having a circular profile in radial section and having a third radius of curvature R3 of pre-established value; the curvature of the section 21 of the lateral surface 17 is opposite that of the second section 20, in such a way that the third section 21 is delimited by a concave annular surface which connects with continuity with the second section 20, forming with it a bend 22 in radial section.

In the non-limitative example illustrated, the annular concave surface of the section 21 connects with continuity with the second section 20 on one side, forming the bend 22 with it, and on the other side with the lateral cylindrical radially external surface 11 of the end 9 of the internal ring 4 or 8 if present.

According to another aspect of the invention, the cylindrical section 18 of the lateral surface 17 of each annular relief 16 presents a minimum axial extension L1 at least smaller than the axial extension L2 of the first section 19 of the lateral surface 17.

The values of the radii of curvature R2 and R3 can be identical to one another or just very close and can be equal to or preferably lower than the value of the first radius of curvature R1, measured transversally to the axis of rotation A.

Furthermore, according to an important aspect of the invention, the races 7 (FIG. 1), in combination with what has been described so far, are each delimited by a concave annular bottom surface 23 defined in radial section by an arc of a circle and presenting a radius of curvature that is greater than the radius of the balls 5 by such a measure that the outer ring 3 presents an osculation, defined as the ratio between the radius of the circular profile of the races 7 in radial section and the diameter of the balls 5 (i.e. radius of the circular profile of the races 7 divided by the diameter of the balls 5), comprised between 0.51 and 0.56.

In combination with this first critical parameter, the value of the first radius of curvature R1 must always be greater than 12 mm, in particular in the case in which the radial thickness of the rings 4 or 8 is greater than 2 mm. In general, the greater the value of the radius R1 conserving the continuity of the lateral surface 17, the lower the stress bearing on the balls 5 during the assembly stage, that takes place in a known manner, in which the balls 5 must pass ("jump over") the relief 16.

In summary, the roller bearing 1 for a steering system or a vehicle wheel hub assembly includes at least one first ring 4, 8, at least one first annular race 6 formed in the first ring 4, 8, at least one second ring 3, a second annular race 7 formed in the second ring 3, wherein the second annular race 7 is positioned facing the at least one first annular race 6. The roller bearing 1 further comprises a plurality of rolling bodies 5 inserted between the first ring 3 and the second ring 4, 8, enabling the rings 3, 4, 8 to rotate relatively around an axis of rotation A.

The rolling bodies 5 collectively create at least one annular band of rolling bodies that engage with the at least one first annular race 6 and the second annular race 7. A surface 14 comprising the first annular race 6 additionally includes an annular bottom surface 12, a first section 19, a lateral surface 17, a cylindrical section 18, a second section 20, and a third section 21.

The annular bottom surface 12 is formed including a concave annular surface, the annular bottom surface 12 being delimited by a first end and a second end.

The first section 19 is formed having a convex annular surface with a first radius of curvature R1, the first section 19 delimited by a first end and a second end.

The lateral surface 17 is delimited by a first end and a second end.

The cylindrical section 18 is shaped having a constant radial dimension from the axis of rotation, wherein the cylindrical section 18 is delimited by a first end and a second end.

The second section 20 is shaped having a convex annular surface with a second radius of curvature R2. The second section 20 is delimited by a first end and a second end.

The third section 21 is shaped having a concave annular surface with a third radius of curvature R3. The third section 21 is delimited by a first end and a second end.

The sections are arranged with respect to one another as follows:

The annular bottom surface 12 is arranged having the first end located proximate one end of the first ring and the second end located proximate a central section of the first annular race 6.

The first section 19 is located between the annular bottom surface 12 and the lateral surface 17 with the first end of the first section 19 being continuous with the second end of the annular bottom surface 12, The lateral surface 17 is located between the first section 19 and the cylindrical section 18, with the first end of the lateral surface 17 being continuous with the second end of the first section 19.

The cylindrical section 18 is shaped having a constant diameter across the section. The cylindrical section 18 is located between the lateral surface 17 and the second section 20, with the first end of the cylindrical section 18 being continuous with the second end of the lateral surface 17.

The second section 20 is located between the cylindrical section 18 and the second section 20, with the first end of the second section 20 being continuous with the second end of the cylindrical section 18.

The third section 21 is arranged having the first end continuous with the second section 20 and the second end located proximate a second end of the first ring.

A bend 22 is formed on each side of a junction between the first end of the third section 21 and the second end of the second section 20, The bend 22 is shaped having a concave annular surface.

The diameter of the cylindrical section 18 is greater than a smallest diameter of the annular bottom surface 12, wherein the cylindrical section 18 provides an axial retention shoulder for the rolling bodies 5.

In conclusion, thanks to the geometry described for the relief 16 and observance of the indicated osculation values, the minimization is obtained of the stresses bearing on the balls 5 during the assembly stage, the maximum reduction of the axial extension of the cylindrical section 18 and, therefore, the minimization of the duration of application during assembly of the maximum mechanical stress to which the balls 5 are subjected. Furthermore, reduced rolling friction values of the balls 5 are also obtained when they are engaged in the races 6 and 7, all with limited axial dimensions.

On the basis of what has been described it is clear, finally, that the bearing 1 could have reliefs 16 obtained in correspondence with respective opposed ends 25 (FIG. 1) of the outer ring 3, instead of on the ends 9 of both the inner rings 4 and 8; in this case, it would be each inner ring 4 and 8 that would present an osculation comprised between 0.51 and 0.56, defined as the ratio between the radius of the circular profile of the races 6 in radial section and the diameter of the balls 5 (i.e. radius of the circular profile of the races 6 divided by the diameter of the balls 5).

All the scopes of the invention are therefore achieved.

The invention claimed is:

1. A roller bearing for a steering system or a vehicle wheel hub assembly comprising:
   at least one first ring;
   at least one first annular race formed in the first ring;
   at least one second ring;
   a second annular race formed in the second ring, wherein the second annular race is positioned facing the at least one first annular race; and
   a plurality of rolling bodies inserted between the first ring and the second ring that enable the rings to rotate relatively around an axis of rotation, wherein the rolling bodies collectively create at least one annular band of rolling bodies that engage with the at least one first annular race and the second annular race;
   wherein a surface comprising the first annular race includes:
      an annular bottom surface having a concave annular surface, the annular bottom surface delimited by a first end and a second end;
      a first section having a convex annular surface with a first radius of curvature, the first section delimited by a first end and a second end;
      a lateral surface delimited by a first end and a second end;
      a cylindrical section having a constant radial dimension from the axis of rotation, the cylindrical section delimited by a first end and a second end;
      a second section having a convex annular surface with a second radius of curvature, the second section delimited by a first end and a second end;
      a third section having a concave annular surface with a third radius of curvature, the third section delimited by a first end and a second end;

the annular bottom surface arranged having the first end located proximate one end of the first ring and the second end located proximate a central section of the first annular race, the first section being located between the annular bottom surface and the lateral surface with the first end of the first section being continuous with the second end of the annular bottom surface, the lateral surface being located between the first section and the cylindrical section with the first end of the lateral surface being continuous with the second end of the first section, the cylindrical section having a constant diameter across the section, the cylindrical section being located between the lateral surface and the second section with the first end of the cylindrical section being continuous with the second end of the lateral surface, the second section being located between the cylindrical section and the second section with the first end of the second section being continuous with the second end of the cylindrical section, the third section arranged having the first end continuous with the second section and the second end located proximate a second end of the first ring, and a bend having a concave annular surface, the bend formed on each side of a junction between the first end of the third section and the second end of the second section, the diameter of the cylindrical section being greater than a smallest diameter of the annular bottom surface, wherein the cylindrical section provides an axial retention shoulder for the rolling bodies.

2. The roller bearing according to claim 1, wherein the cylindrical section presents a minimum axial extension at least smaller than that of the first section.

3. The roller bearing according to claim 1, wherein the value of the second radius of curvature and the value of the third radius of curvature are equal to or lower than the value of the first radius of curvature.

4. The roller bearing according to claim 1, wherein the rolling bodies are balls having a radius,
wherein the second race is delimited by a concave annular bottom surface having a radius of curvature,
wherein a ratio between the radius of curvature of the annular bottom surface of the second race and the diameter of the balls is between 0.51 and 0.56,
wherein radius of curvature of the annular bottom surface is greater than the radius of the balls by such an amount to create an osculation between the annular bottom surface of the second race and the balls.

5. The roller bearing according to claim 1, wherein the value of the first radius of curvature is greater than 12 mm.

6. The roller bearing according to claim 1, wherein the at least one first annular race and the second annular race defines a first pair of annular races, the roller bearing further comprising a second pair of first and second annular races,
wherein the rolling bodies are balls and are housed in two bands of rolling bodies arranged adjacently, the rolling bodies engaging the first pair of first and second annular races and the second pair of first and second annular races, the first pair of first and second annular races and the second pair of first and second annular races being arranged adjacently to one another,
wherein the second annular race of the first pair and the second annular race of the second pair are delimited each by annular surface, each of the second races comprising a concave bottom having a radius of curvature that is greater than the radius of the balls such that the second ring presents an osculation between the annular bottom surfaces of the second races and the balls, defined as a ratio between the radius of curvature of the annular concave bottom surfaces of the second races and the diameter of the balls between 0.51 and 0.56.

7. The roller bearing according to claim 6, wherein the at least one first ring is a pair of inner rings and the second ring is an outer ring; the first annular races being formed on a radially external lateral surface of the inner rings and the second annular races being formed on a radially internal lateral surface of the outer ring.

8. A wheel hub assembly including a roller bearing, the roller bearing comprising:
at least one first ring;
at least one first annular race formed in the first ring;
at least one second ring;
a second annular race formed in the second ring, wherein the second annular race is positioned facing the at least one first annular race; and
a plurality of rolling bodies inserted between the first ring and the second ring that enable the rings to rotate relatively around an axis of rotation, wherein the rolling bodies collectively create at least one annular band of rolling bodies that engage with the at least one first annular race and the second annular race;
wherein a surface comprising the first annular race includes:
an annular bottom surface having a concave annular surface, the annular bottom surface delimited by a first end and a second end;
a first section having a convex annular surface with a first radius of curvature, the first section delimited by a first end and a second end;
a lateral surface delimited by a first end and a second end;
a cylindrical section having a constant radial dimension from the axis of rotation, the cylindrical section delimited by a first end and a second end;
a second section having a convex annular surface with a second radius of curvature, the second section delimited by a first end and a second end;
a third section having a concave annular surface with a third radius of curvature, the third section delimited by a first end and a second end;
the annular bottom surface arranged having the first end located proximate one end of the first ring and the second end located proximate a central section of the first annular race,
the first section being located between the annular bottom surface and the lateral surface with the first end of the first section being continuous with the second end of the annular bottom surface,
the lateral surface being located between the first section and the cylindrical section with the first end of the lateral surface being continuous with the second end of the first section,
the cylindrical section having a constant diameter across the section, the cylindrical section being located between the lateral surface and the second section with the first end of the cylindrical section being continuous with the second end of the lateral surface,
the second section being located between the cylindrical section and the second section with the first end of the second section being continuous with the second end of the cylindrical section, the third section arranged having the first end continuous with the second section and the second end located proximate a second end of the first ring, and a bend having a concave annular surface, the bend formed on each side of a junction between the first end of the third section and the second end of the second section, the diameter of the cylindrical section being greater than a smallest diameter of the annular bottom surface, wherein the cylindrical section provides an axial retention shoulder for the rolling bodies.

* * * * *